US005672104A

United States Patent [19]

Baxter

[11] Patent Number: 5,672,104

[45] Date of Patent: Sep. 30, 1997

[54] BUSINESS FORMS USING CARBONLESS SHEETS AND NON-IMPACT LASER PRINTING AND RELATED METHOD

[75] Inventor: George Baxter, Youngstown, Ohio

[73] Assignee: Moore Business Forms, Inc., Grand Island, N.Y.

[21] Appl. No.: 294,057

[22] Filed: Aug. 25, 1994

Related U.S. Application Data

[60] Continuation of Ser. No. 51,438, Apr. 22, 1993, abandoned, which is a division of Ser. No. 783,623, Oct. 24, 1991, abandoned.

[51] Int. Cl.[6] .................................................. B29D 30/38

[52] U.S. Cl. ........................... 462/18; 156/295; 156/277; 156/908; 462/2; 462/25; 462/901; 281/2; 283/81

[58] Field of Search ................................... 156/277, 295, 156/283, 908; 282/12 R, 11.5 A, 11.5 R, 12 A; 283/71, 81; 281/2; 229/69

[56] References Cited

U.S. PATENT DOCUMENTS

| | | | |
|---|---|---|---|
| 2,105,448 | 1/1938 | Brenn | 282/12 |
| 2,926,025 | 2/1960 | Sornberger | 282/22 |
| 3,501,365 | 3/1970 | Marshall | 161/38 |
| 3,852,089 | 12/1974 | Barouh et al. | 117/2 TC |
| 4,248,457 | 2/1981 | Torbeck | 282/7 |
| 4,938,505 | 7/1990 | Gruttemeyer et al. | 282/12 R |
| 5,334,571 | 8/1994 | Baxter | 503/226 |
| 5,346,430 | 9/1994 | Baxter | 462/2 |

*Primary Examiner*—Merrick Dixon

*Attorney, Agent, or Firm*—Nixon & Vanderhye P.C.

[57] ABSTRACT

A multi-part carbonless business form includes a first upper CB sheet having a first heat and/or pressure sensitive adhesive strip or a lower surface thereof and extending along and adjacent one marginal edge thereof; a second lower CE sheet having a second heat and/or pressure sensitive adhesive strip of substantially identical adhesive composition as the first strip, on an upper surface thereof and extending along and adjacent a corresponding marginal edge in substantial vertical alignment with the first adhesive strip; and at least one intermediate CFB sheet located between the first upper sheet and the second lower sheet and having a first plurality of apertures vertically aligned with the first and second adhesive strips to thereby allow heat and/or pressure sealing engagement between the upper CB sheet and the lower CF sheet through the first plurality of apertures in the intermediate CFB sheet.

12 Claims, 2 Drawing Sheets

BUSINESS FORMS USING CARBONLESS SHEETS AND NON-IMPACT LASER PRINTING AND RELATED METHOD

RELATED APPLICATIONS

This is a continuation of application Ser. No. 08/051,438 filed Apr. 22, 1993 now abandoned, which is a division of Ser. No. 07/783,623 filed Oct. 24, 1991, now abandoned. This application is also related to application Ser. No. 07/779,335 filed Oct. 18, 1991, now U.S. Pat. No. 5,334,571 issued Aug. 2, 1994.

BACKGROUND AND SUMMARY OF THE INVENTION

It has become increasingly popular to use high speed non-impact printers (for example, laser printers such as the Xerox 9790, Kodak 1392 or IBM 3827 in the production of carbonless business forms. In the production of business forms from single sheets or "cut sets" as opposed to continuous webs, manual pasting with edge padding adhesives is required. This, of course, is a potential bottleneck in the processing of such "cut sets" through high speed non-impact laser printers. In addition, manual pasting along with subsequent manual fanning and packing operations prior to shipping and/or use of the forms, results in the build-up of toxic solvent fumes which, of course, are not only undesirable but harmful to workers in the vicinity.

According to the present invention, it is possible to utilize high speed non-impact printers to form multiple part carbonless business forms from cut sets while avoiding the problems associated with manual pasting.

In accordance with one exemplary embodiment of the invention, a three part form set includes a first or upper sheet or form part provided with a continuous strip (or a plurality of spots in line form, also considered an adhesive "strip") of a heat and/or pressure seal adhesive on its underside, a second, or lower form part provided with a similar strip of heat and/or pressure seal adhesive on its upper side; and an intermediate form part provided with appropriately placed punch holes aligned with the adhesive on the upper and lower form parts, allowing contact between the respective overlying adhesive strips on the first and last parts through the punch holes of the intermediate part, and thereby effectively bonding the assembly into a form set. In accordance with conventional carbonless practice, the upper form part is a CB sheet, the lower form part is a CF sheet, and the intermediate form parts are CFB sheets.

The single sheets of the form set as described above can be preprinted, punched, perforated, OCR encoded, etc. with additional value added features including color printing prior to assembly, without interference or difficulty by reason of the presence of the heat and/or pressure sensitive adhesive strips.

The heat and/or pressure seal adhesive strips applied to the first (or upper) and last (or lower) sheets are preferably arranged in linear fashion, although they may have other geometric configurations. Preferably, the adhesive is heat and/or pressure activated permanent adhesive such as that sold commercially by Moore Business Forms, Inc. of Lake Forest, Ill., and acted upon by, for example, a commercial Moore pressure sealer known as the Model 4800B, or a Moore Edge Sealer of the type disclosed in co-pending application Ser. No. 07/426,650 filed Oct. 26, 1989, whichever is appropriate.

It will further be understood that while the strips or spots of adhesive may be applied adjacent only one edge of the upper and lower form parts, they may also be applied to two or more edges, depending on the form set configuration.

It is anticipated that the above described concept may also be utilized to accommodate non-impact printers using continuous web paper as opposed to individual sheets.

The individual sheets, after printing in the non-impact printer, may be assembled into multi-part business forms in an accumulator where the individual sheets are collated and assembled into form sets, ready for heat and/or pressure sealing. In a related feature, a sensing mark on the first and last of form parts of a set may be utilized to trigger the passage of the collated form set through a conventional heat and/or pressure sealing device, before further succeeding sheets arrive in the accumulator to complete the next set.

It will be appreciated that in addition to the three-part form set described above, many other form set configurations may be produced in accordance with this invention. For example, a two-part carbonless business form has, in sequence, from top to bottom, a CB (coated back) sheet and a CF (coated front) sheet with continuous strips or spots of adhesive on the underside of the upper form part and the upper side of the lower form part in generally vertical alignment. In a four-part form, the two CFB (coated front and back) intermediate form parts will be provided with aligned punch holes so that the adhesive strips or spots on the upper (CB) and lower (CF) form parts may be heat and/or pressure sealed through the punch holes on the intermediate form parts. In a five-part form, the preferred arrangement is to provide a middle (CFB) form part which has adhesive strips on both its upper and lower surface in vertical alignment with punch holes provided on the second (CFB) and fourth (CFB) form parts, with adhesive strips also being applied to the underside of the upper (CB) form part and the upper side of the lower (CF) form part.

Thus, in accordance with the broader aspects of the invention, there is provided a method of printing and assembling multi-sheet business forms from a plurality of cut sheets comprising the steps of applying a heat and/or pressure sensitive adhesive strip to a lower surface of a first sheet and an upper surface of a second sheet, the adhesive strips on the first and second sheets being in substantial vertical alignment when the first and second sheets are in overlying relationship; providing at least one intermediate sheet, the intermediate sheet having a plurality of apertures therein; passing the first, second and the at least one intermediate sheet through a non-impact printer; collating the first, second and at least one intermediate sheet in overlying relationship so as to provide an individual collated form with the adhesive strips and plurality of apertures in alignment; and passing the collated form through a heat and/or pressure sealing device to thereby activate the heat and/or pressure sensitive adhesive strips by mutual contact through the plurality of apertures.

According to another aspect of the present invention, a multi-part carbonless business form is provided which comprising a first upper sheet having a first heat and/or pressure sensitive adhesive strip adjacent one marginal edge thereof; a second lower sheet having a second heat and/or pressure sensitive adhesive strip adjacent a corresponding marginal edge thereof; and at least one intermediate sheet having a first plurality of apertures vertically aligned with the first and second pressure sensitive adhesive lines.

It is thus a primary object of the present invention to provide for the effective manufacture of multi-part carbonless business forms utilizing non-impact printers, without having to manually apply adhesive to secure the various parts of the form. This and other objects of the invention will become clear from an inspection of the detailed description of the invention and from the appended claims.

DETAILED DESCRIPTION OF THE DRAWINGS

Figure 1:
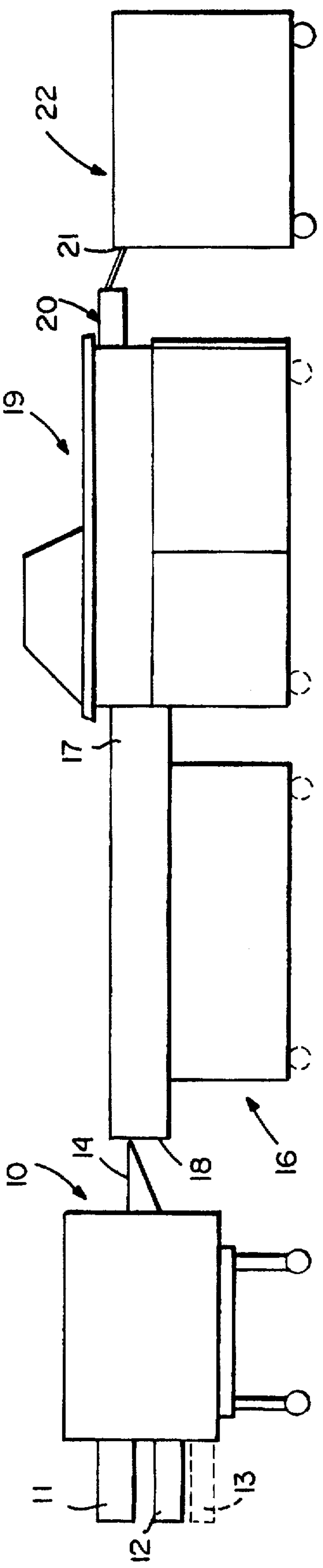
FIG. 1 is a schematic side view of exemplary equipment according to the invention, for practicing the method in accordance with the invention.

FIG. 1 illustrates exemplary equipment which may be employed to produce multi-part carbonless business form sets in accordance with this invention. The equipment includes a high speed non-impact (for example, laser) printer 10, such as a Xerox 9790, Kodak 1392, or IBM 3827. The printer 10 has two or more in-feed lines (for example, feed trays 11, 12, 13 which feed sheets to which heat and/or pressure sensitive adhesive strips have already been applied to the printer) and a printed sheet discharge 14. The printer discharge 14 is connected to an inlet conveyor 15 of a conventional accumulator 16, such as Model 418 manufactured by GBR of Massachusetts. The accumulator 16 collates and stacks the individual printed sheets from the printer 10 so that each form set is in precisely aligned relationship. The form sets are subsequently discharged from the discharge 17 of the accumulator 16, one at a time. The discharge 17 is connected to an inlet conveyor section 18 of a conventional pressure sealer 19, such as a Moore 4800B pressure sealer (or a Moore edge sealer for heat sensitive adhesive applications identified above). The pressure sealer 19 (or heat sealer) applies pressure with narrow rollers (located only above the glue strips or spots of pressure activated adhesive on the stacked sheets) to permanently seal the edges of the sheets together. The heat and/or pressure sealer is effective to seal any number of form parts, it being only necessary to align the sealing rollers precisely with the strips or spots of adhesive on the individual form sheets.

Completed multi-part forms are discharged from the discharge conveyor section 20 of the pressure sealer 19 and fed to an inlet 21 of a collecting device 22 which may be a bin or tray or the like. After the forms are collected in the collecting device 22, they may be acted upon as desired depending upon their ultimate use. For example, if the forms are designed as mailers, they can be folded and otherwise assembled into final configuration or, if suitable additional equipment is utilized, a folder and other pressure sealer may be provided between the pressure sealer 19 and the collecting device 22.

As illustrated in FIG. 1, all of the components 10, 16, 19 and 22 may be mounted on wheel supports so that the equipment can be moved into ready operative association with each other, to act on the individual sheets or form sets in the desired manner. Alternatively, one or more pieces of equipment, for example, the laser printer 10, may be stationary type while the remainder of the equipment may be mobile.

In order to facilitate the collection and collating of individual sheets into assembled form sets, prior to introduction into the heat and/or pressure sealer, sensing marks 24 may be incorporated in inconspicuous locations on the front of the first form part and on the back of the last form part. For example, the marks may be applied in the top left hand margin of the first form part (see FIG. 2), and a corresponding corner of the last form part, where such marks may be readily scanned by conventional scanning equipment. These sensing marks may consist of conventional bar code symbology in accordance with, for example, the Uniform Symbology Specification (USS) 39. The accumulator 16, upon scanning first and second marks of a pair indicative of a complete set, will pass the collated set of sheets for that form assembly to the pressure sealer 19 before further succeeding sheets arrive to complete the next set.

Figure 2:
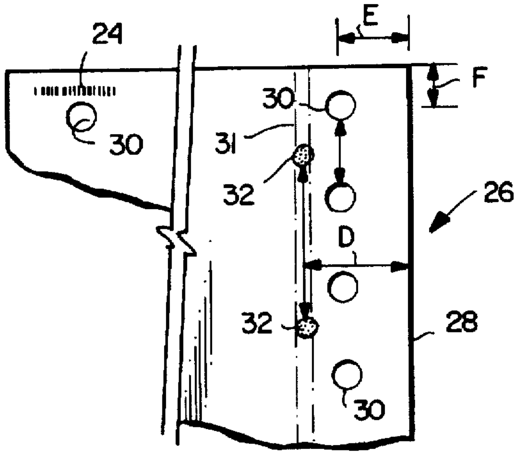
FIG. 2 is a partial top view of an upper or lower form part in accordance with the invention.

With specific reference to FIG. 2, a single sheet 26 is illustrated which can be employed as either a top or bottom sheet of a form set in accordance with this invention. The sheet 26 (a CB sheet if used as a top sheet in accordance with carbonless practice) is provided along its longitudinal edge 28 with a plurality of punched marginal feed holes 30. A continuous glue strip 31 (shown in phantom) or a longitudinally aligned plurality of glue spots 32 is located interiorly of the feed holes 30 and extends parallel thereto along the length of the sheet. In a preferred arrangement, the glue spots 32 are spaced about ⅝ of an inch from the marginal edge 28 as indicated by the dimension D.

It will be appreciated that in the event sheet 26 is to be utilized as the top sheet of a form set, the adhesive 32 will be applied to the underside of the sheet. On the other hand, if sheet 26 is to be utilized as the bottom sheet (a CF sheet in accordance with carbonless practice) of the form set, then the glue spots 32 will be applied to the upper side of the sheet. As will be described further below in conjunction with the five-part form illustrated in FIG. 7, the middle or third sheet (a CFB sheet) of a five-part form set would be similar to sheet 26 but with a glue strip 32 applied to both the upper and lower sides of the sheet.

Figure 3:
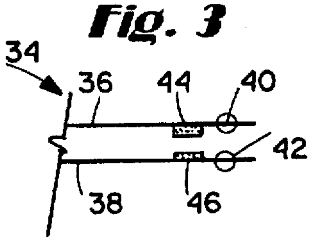
FIG. 3 is a partial schematic side view of a two-part form in accordance with the invention.

Turning to FIG. 3, a two-part form 34 is illustrated which includes a top (CB) sheet 36 and a bottom (CF) sheet 38. Marginal feed holes 40, 42 respectively, extend along the marginal edge of each sheet, in vertical alignment (when the sheets are collated and stacked). Longitudinally extending adhesive strips 44, 46 are applied to the lower and upper surfaces of sheets 36, 38, respectively, so that the adhesive strips 44, 46 face each other, also in vertical alignment. It will be appreciated, of course, that the overlying marginal edges of sheets 36, 38 will be directly sealed along their entire length by the pressure sealer 19 (or heat sealer, if appropriate).

Figure 4:
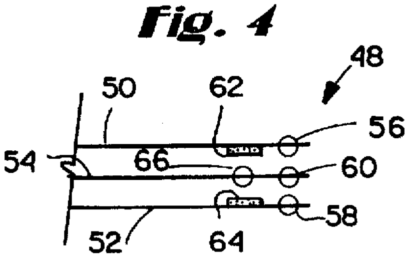
FIG. 4 is a partial schematic side view of a three-part form in accordance with the invention.

In FIG. 4, there is illustrated a three-part form 48 which includes an upper (CB) sheet 50 and a lower (CF) sheet 52 along with an intermediate (CFB) sheet 54. The upper sheet 50, lower sheet 52 and intermediate sheet 54 are provided with lines of marginal feed holes 56, 58 and 60, respectively. In the stacked or collated position as shown in FIG. 4, each plurality of feed holes 56, 58 and 60 is in vertical alignment.

Sheet 50 is also provided on its underside with an adhesive strip 62 while the lower sheet 52 is provided on its upper surface with a similar adhesive strip 64 vertically aligned with the adhesive strip 62. The intermediate sheet 54 is provided with a plurality of punched apertures 66 which extend parallel to the marginal feed holes 60 and which are vertically aligned with the adhesive strips 62, 64. Upon stacking and collating a form set comprising the three sheets 50, 52 and 54, heat and/or pressure will be applied directly above and/or below adhesive strips 62, 64 to press the adhesive strips into heat and/or pressure sealing engagement, through the punched holes 66, thereby securing the three-part form together along one marginal edge.

Figure 5:
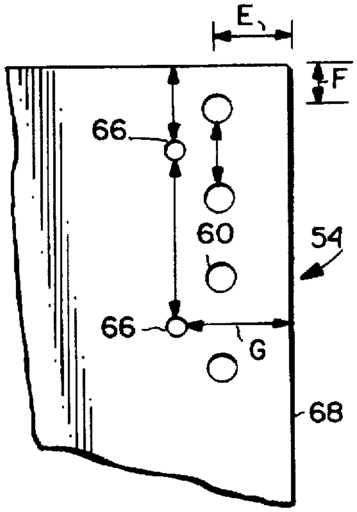
FIG. 5 is a partial top view of an intermediate form part in accordance with the invention.

FIG. 5 illustrates the positional relationship of the punched apertures 66 and the marginal feed holes 60 of the intermediate sheet 54. In a preferred format, the marginal feed holes 60 are spaced ½ inch from the marginal edge 68 of the sheet to the center line of the feed holes (dimension E). The initial feed hole is spaced ¼ inch from the transverse edge 70 of the sheet to the center line of the feed hole (dimension F). The punched apertures 66, which are in vertical alignment with the adhesive strips 62, 64 are preferably located ⅝ inch from the edge of the sheet (dimension G). It will be understood that the above-described arrangement is exemplary only, and other arrangements of feed holes, punched holes and adhesive strips may be employed.

Figure 6:
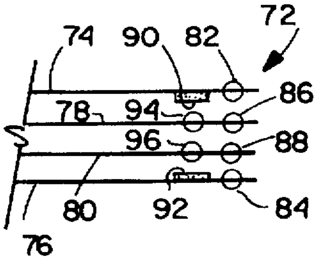
FIG. 6 is a partial schematic side view of a four-part form in accordance with the invention.

In FIG. 6, a four-part form constructed in accordance with the invention is illustrated. The form 72 includes an upper (CB) or top sheet 74, a lower (CF) or bottom sheet 76 and a pair of intermediate (CFB) sheets 78, 80. Upper sheet 74 is provided along one marginal edge with a plurality of longitudinally extending marginal feed holes 82 while the bottom or lower sheet 76 is provided with a plurality of longitudinally extending, spaced marginal feed holes 84 which are vertically aligned with the holes 82. Intermediate sheets 78, 80 are provided with respective pluralities of marginal feed holes 86, 88 which are also in vertical alignment with the feed holes 82, 84.

The upper or top sheet 74 is provided on its underside with a longitudinally extending heat and/or pressure sensitive adhesive strip 90 which extends parallel to the feed holes 82. Similarly, the lower or bottom sheet 76 is provided on its upper side with a longitudinally extending heat and/or pressure sensitive adhesive strip 92 which is vertically aligned with the adhesive strip 90 of the upper form part 74. The intermediate sheets 78 and 80 each contain a plurality of punched apertures 94, 96 respectively, which are in vertical alignment with the adhesive strips 90, 92 so that upon the application of heat and/or pressure to the longitudinally extending adhesive strips, the four-part form will be secured together with the respective adhesive strips 90, 92 in heat and/or pressure sealed engagement through the apertures 94, 96 in the intermediate sheets 78, 80.

Figure 7:
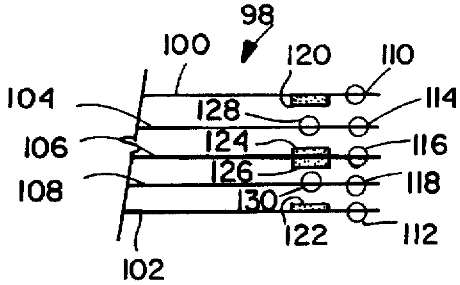
FIG. 7 is a partial schematic side view of a five-part form in accordance with the invention.

In FIG. 7, there is illustrated a five-part form constructed in accordance with this invention. The form 98 includes an upper (CB) form part 100, a lower (CF) form part 102 and three intermediate (CFB) sheets 104, 106 and 108. Each of the sheets 100, 102, 104, 106 and 108 are provided with respective pluralities of marginal feed holes 110, 112, 114, 116 and 118 in substantially vertical alignment. At the same time, the upper sheet 100 is provided on its underside with a longitudinally extending heat and/or pressure sensitive adhesive strip 120, and lower sheet 102 is provided on its upper side with a longitudinally extending heat and/or pressure sensitive adhesive strips 122. Middle sheet 106 is provided on both upper and lower surfaces with longitudinally extending heat and/or pressure sensitive adhesive strips 124, 126 respectively. The second intermediate sheet 104 is provided with a plurality of punched apertures 128 while the fourth sheet 108 is provided with a similar plurality of punched apertures 130. Upon application of heat and/or pressure adhesive strips 120 and 124 will be in heat and/or pressure sealed engagement through the apertures 128, while adhesive strips 122 and 126 will be in pressure sealed engagement together through apertures 130, thus securing all of the form parts 100, 102, 104, 106 and 108.

While the above described form sets have been described only with respect to adhesive strips applied along one marginal edge of the form set, it will be appreciated that two or more edges may be similarly sealed, depending on the form set configuration.

It will be further appreciated that in addition to the relatively simple printing/sealing procedure described above, other post-printing (but pre-sealing) paper handling devices may be utilized to enhance the value added concept, for example, to cool the sheets after heat fusing of printed data, to realign forms to count forms, etc. so as to customize the system to meet the requirements of high, medium and low volume users, and for both high and slow speed non-impact printers.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A multi-part business form comprising a first upper sheet having a first heat and/or pressure sensitive adhesive strip extending along and adjacent one marginal edge thereof; a second lower sheet having a second heat and/or pressure sensitive adhesive strip extending along and adjacent a corresponding marginal edge thereof and in substantial vertical alignment with said first adhesive strip; and at least one intermediate sheet located between said first upper sheet and said second lower sheet and having a first plurality of apertures vertically aligned with said first and second adhesive strips.

2. The multi-part business form of claim 1 including a second intermediate sheet located between said first and second sheets, said second intermediate sheet having a second plurality of apertures aligned with said first plurality of apertures.

3. The multi-part business form of claim 1 including a third, middle intermediate sheet located between said first and second intermediate sheets.

4. The multi-part business form of claim 3 wherein said middle of the three intermediate sheets is provided with third and fourth strips of heat or pressure sensitive adhesive, overlying each other on opposite sides of the middle sheet, and in substantial vertical alignment with said first and second heat or pressure sensitive adhesive strips and said first and second aligned plurality of apertures.

5. The multi-part business form of claim 1 wherein each of said upper, lower and said at least one intermediate sheet is provided with vertically aligned marginal feed holes lying adjacent said first and second heat or pressure sensitive adhesive strips and said first plurality of apertures.

6. The multi-part business form of claim 2 wherein each of said upper, lower, said at least one intermediate sheet and said second intermediate sheet is provided with marginal feed holes lying adjacent said first and second heat or pressure sensitive adhesive strips and said plurality of apertures.

7. The multi-part business form of claim 3 wherein each of said upper, lower, said at least one intermediate sheet and said second and third intermediate sheets is provided with vertically aligned marginal feed holes lying adjacent said first and second heat of pressure sensitive adhesive strips and said first and second plurality of apertures.

8. The multi-part business form of claim 1 wherein one or more of said sheets is provided with non-impact printing.

9. The multi-part business form of claim 1 wherein said form is carbonless and wherein said first sheet is a CB sheet, said second sheet is a CF sheet and said at least one intermediate sheet is a CFB sheet.

10. The multi-part business form of claim 1 wherein said first plurality of apertures are axially spaced about 1.0 inch apart.

11. The multi-part business form of claim 2 wherein said form is carbonless and wherein said first sheet is a CB sheet, said second sheet is a CF sheet, said at least one intermediate sheet is a CFB sheet and said second intermediate sheet is a CFB sheet.

12. The multi-part business form of claim 3 wherein said form is carbonless and wherein said first sheet is a CB sheet, said second sheet is a CF sheet, said at least one intermediate sheet, said second intermediate sheet and said third intermediate sheet are CFB sheets.

* * * * *